Figure 1:
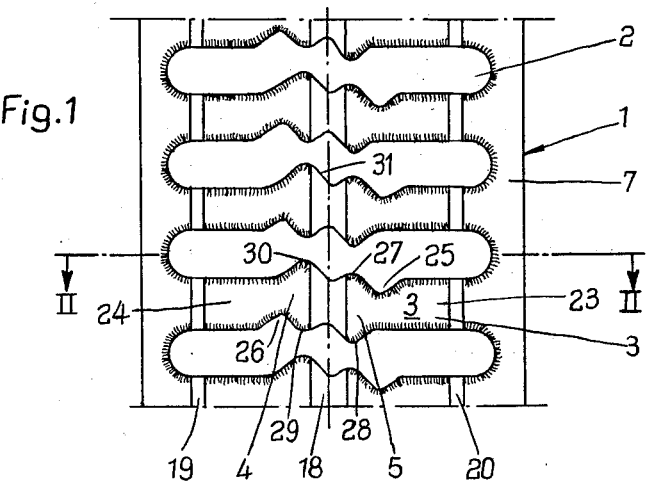

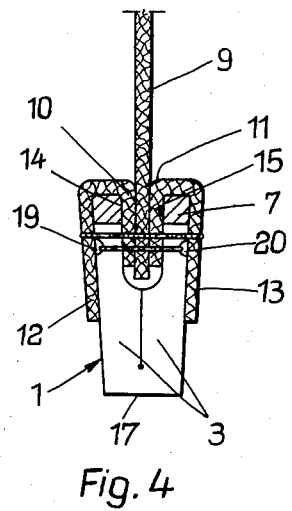
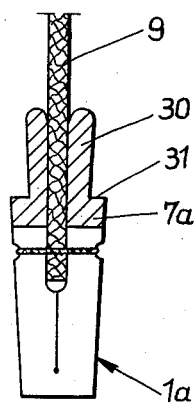
Fig. 4   Fig. 5
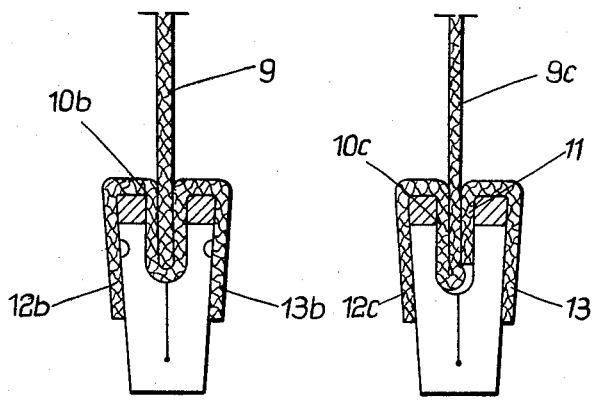
Fig. 6   Fig. 7

United States Patent Office 3,063,119
Patented Nov. 13, 1962

3,063,119
SLIDABLE FASTENER
Friedrich-Wilhelm Diekermann, deceased, late of Much, Siegkreis, Germany, by Margarete Diekermann and Erika Brandner, heirs and guardian of minor heir, Much, Siegkreis, Germany, assignors to Patentgesellschaft Plate & Co., Altdorf, Switzerland
Filed Aug. 18, 1958, Ser. No. 755,795
Claims priority, application Great Britain Aug. 27, 1957
4 Claims. (Cl. 24—205.1)

The invention relates to the production of slidable fasteners made of synthetic material, more particularly of rubbery or thermoplastic material, with two rows of opposed interlocking connecting links and a process for its production.

The connecting links, of known slidable fasteners, are similar to those of metal slidable fasteners, fixed singly on the carrying strap or the like. It is also known to produce a series of links which are arranged side by side and to connect them simultaneously with the carrying strap. The links or link groups are thereby produced for example, by extrusion die or injection moulding. These processes, however, are complicated and, due to the high cost of the dies, expensive.

A further disadvantage of the known slidable fasteners made of synthetic material, is that the generally used synthetic materials which can be hardened do not stand up to wear, because of their tendency to break, whereas the highly elastic thermoplastic materials, for example, which have been used lately, especially the polyamide, make it difficult to provide a safe connection of the links with the carrying straps.

Further, slidable fasteners of synthetic materials have been known, where the individual connecting links are produced in one piece with a continuous connecting strip in order to facilitate the fixing on to the carrying strap and to prevent breaking out of single links. These fasteners have usually a considerably reduced flexibility; besides, their production is very complicated and expensive.

All above mentioned known slidable fasteners of synthetic material have the further great disadvantage, that shearing force acting transversely to the plane of the carrying straps, tends to separate the individual connecting links, thus opening the fastener or even rendering it inoperable.

On the other hand, slidable fasteners made of synthetic materials are especially preferred by the buyer because of their light weight, their fastness to light and brilliant colours, their pleasing forms and their obvious suitability for textiles or the like.

The object of the present invention is a slidable fastener which, as regards the form of its connecting links and its process of production preferably utilizes highly elastic materials, such as rubbery or thermoplastic materials.

The process according to the invention for producing a slidable fastener made of synthetic material consists principally in that a flat, band-like form strip of an elastic and flexible material is used, into which, in a longitudinal direction of the form band, spaced according to the divisions of the finished slidable fastener, successive transverse slots are punched providing side bars with two enlargements each, forming the heads of the connecting links on both sides of the middle line of the form strip, as well as connecting bars along the edges of the form strip to hold these transverse side bars. Thereafter each form strip is folded along its middle line, whereby the transverse side bars form the connecting links of the slidable fastener, and finally, the two form strips with the opposing connecting links are fixed on a carrying strap.

The flat, band-like form strip can be produced in any desired way. For example, such a strip can preferably be produced in the known manner by using an extrusion press, where from a thermoplastic material, preferably polyamide, an endless band is discharged, which can also be given any desired profile by corresponding alteration of the nozzle.

The punching can be carried out directly from the cooled form strip, coming from the extrusion press, and also in a separate working process. In this way—as for punching sheet metal or strips from other hard material, the punch can cut out parts of the form strip. It is also possible, if necessary under simultaneous heating of the form strip or the punch, to obtain the transverse slots without cutting off pieces of working material, for example by wedge action, i.e. to displace the material sideways towards the side bars, which are consequently thickened. In any case, by the punching process—whether pieces of material are thereby removed or the form strip is only deformed in itself—transverse bars are formed in the middle of the form strip, spaced according to the divisions of the finished slidable fastener, which are held together in a longitudinal direction by connecting bars remaining on both sides of the form strip. By special profiling the carrying strap is—after the folding—inserted without difficulties.

It is also possible to fix both part strips of the fastener according to the invention, without the help of a carrying strap, directly on to the edges of the material, or the like to be joined. Further on, if a slidable fastener with a carrying strap is described, the aforementioned possibility is always included.

The way of fixing each form strip on to its carrying strap or the like, is preferably done by sewing. In this case the threads can be taken around both ends of the transverse bars, i.e. the connecting links, and/or around the connecting bars situated between them, thus providing a secure connection without the necessity of special thread holes in the form strip. The securing of the form strip can also be effected—instead of sewing, or in addition to it—by gluing, or, if the carrying straps or the bordering breadths and the form strips are of a thermoplastic material, by fusion.

Preferably, it is suggested to use a form strip whose internal strip surface after the folding, serving for holding the carrying strap, is slanting in its external zones, the slanting on each side corresponds preferably with half of the thickness of the carrying band or the like, so that the same can rest in the form strip without spreading the two sides, thus leaving the fastener itself completely flat.

It is especially advisable, that the slanting external zones reach from the free edges into the range of the transverse slots. This makes it possible for the inserted carrying strap to stretch to the transverse slots and it can therefore be easily sewn on to the form strip. The form strip itself should preferably be provided on the strip surface, which will be the inner side after folding, with a semicircular groove along its middle line, which will facilitate its later folding.

The form strip should suitably possess a further semicircular longitudinal groove in the middle of the strip surface, which will be the outer side after folding and which will facilitate its folding in U-form and also effect the formation of a plane face on the connecting links, which are formed by the transverse bars. This second longitudinal groove changes after the folding of the form strip into a substantially plane surface.

Furthermore, the form strip should be provided with preferably longitudinal grooves in its slanting external zones which reach over the transverse bars on the strip surface, which, after folding the form strip will be the outer side of the strip, designed to take the threads of the form strip which is sewn to the carrying strap. By means of these grooves which are in the bent state of the form strip on the outer side of the connecting links in the proximity of their roots, the threads around the transverse bars are prevented from sliding off towards the heads of the connecting links and hamper the function of the zip fastener.

In order to provide a secure hold of the fastener when in a closed position and also against shearing stress which could cause a lateral displacing and separating of the connecting links, the invention suggests that the enlargements which form the heads of the connecting links in the middle of the bars in the longitudinal direction of the form strip, are for a fraction of the bar width displaced against each other. In this case, the head of each connecting link consists of two halves which are—in a longitudinal direction—slightly displaced, so that, when the fastener is closed, they press laterally against the interlocking head halves of the opposite form strip, thus supporting each other.

According to a further possibility of the invention, the form strips produced or shaped according to the above described method, can be covered as desired, either on both or on one side after their mounting to a fastener. Covering can be effected by placing into the folded form strip, together with the carrying strip a covering strip, securely fixed to the form strip and protruding from the latter, protruding edges of which are placed around the legs of the form strips and secured, lying sideways over the connecting links. The covering according to the invention has the advantage, that, principally foreign material, especially folds of nearby strips cannot easily get between the still open connecting links of the fastener, thus being caught in it when being closed. Furthermore, the covering on the outside makes it possible to fix the fastener in an unobtrusive way, which is especially appreciated when used for ladies' clothes.

Preferably the cover strip is similar material to the carrying straps or, better still, integral with them. It is also possible to produce the covering strip from material identical or similar to the one into which the fastener is to be fitted, whereas for the carrying straps a different especially strong material is chosen.

Finally, the covering strip can be intentionally different in material, design, colour or the like, from the carrying straps, or the cloth, so as to obtain a special decorative effect.

It is intended to give the folded external zones of the covering strip of both opposed fastener parts such width, as to make it possible for them to meet when the fastener is closed. In this way the indented connecting links of the entire slidable fastener can be covered up on both sides. Then it is not necessary to match the colours of the form strips of a synthetic material with the respective cloth and the production of the form strips can be restricted to one or just a few colours, which are, when finally made into finished slidable fasteners, connected with carrying and covering strips of different colours. This again leads to simpler and cheaper production of the slidable fastener.

The invention is described as follows by means of some examples and in the accompanying drawings:

FIG. 1 is a plan view of a form strip provided with transverse slots.

Figure 2:
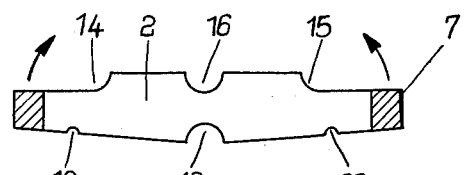

FIG. 2 a section of the strip along the line II—II in FIG. 1.

Figure 3:
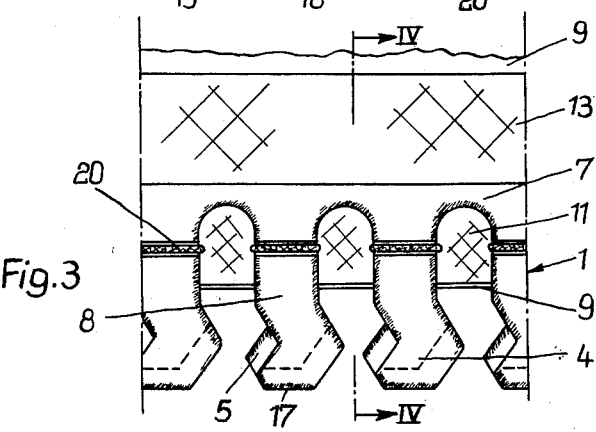

FIG. 3 a plan view of a folded form strip according to FIG. 1, with inserted carrying strip.

FIG. 4 a section along the line IV—IV in FIG. 3.

FIG. 5 a section similar to FIG. 4 through a modified arrangement.

FIGS. 6 and 7 sections similar to FIG. 4, with differently formed covering strips.

Figure 8:
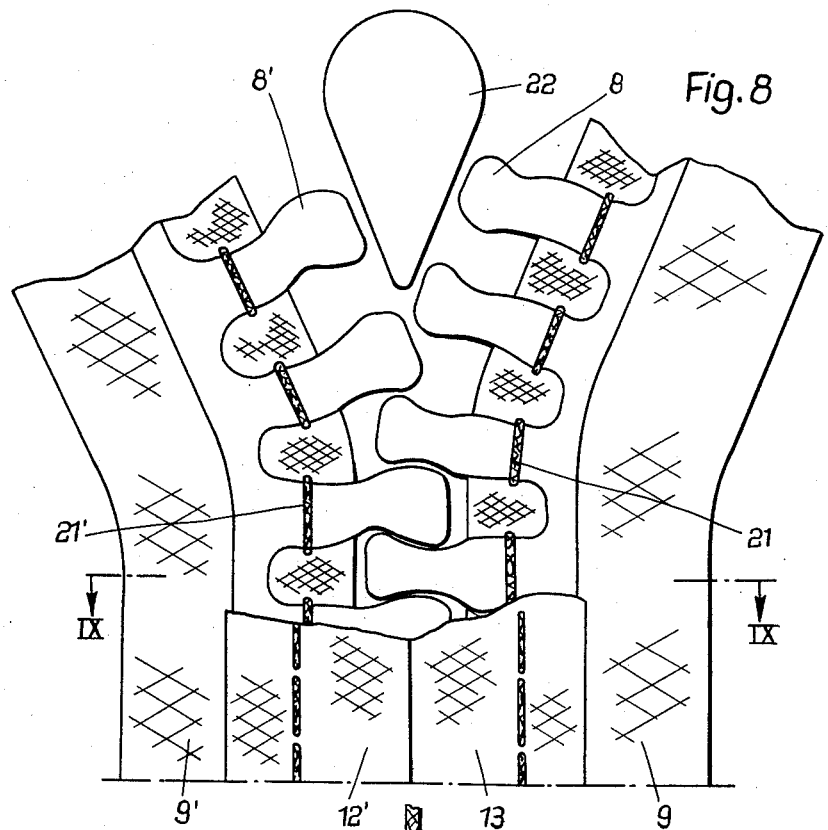
Figure 9:
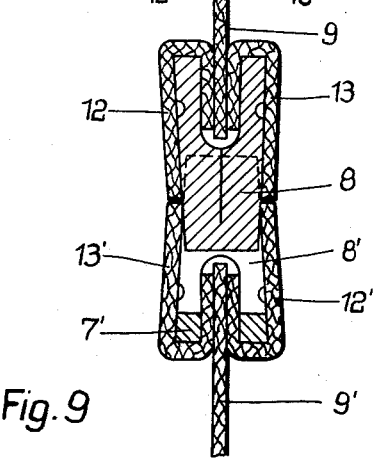

FIG. 8 a partly broken plan view of a slidable fastener according to the invention, and FIG. 9 a section along the line IX—IX in FIG. 8.

FIG. 1 shows, in which way and form the flat, band-like form strip 1 of synthetic material used as starting material, is provided with transverse slots 2, in order to leave between them, spaced according to the divisions of the fastener, the transverse bars 3. The transverse slots 2 must not on either side reach the edge of the form strip, so that the remaining connecting bars 7 can secure the cohesion of the working material. As shown in FIG. 1, each transverse bar 3 has outer intermediate sections 23, 24, the side edges of which are in a common line so that when the strip is folded on its medial longitudinal axis the side edges of opposite sections coincide as shown in FIG. 3. Intermediate section 23 is notched on one side as shown at 25. The opposite intermediate section 24 is also notched on the opposite side edge as shown at 26. Inwardly of the notch 25 the side edge of section 23 has a minor protuberance 27. A similar major protuberance 28 extends from the side edge of section 23 opposite the protuberance 27. Similar minor protuberance 29 and major protuberance 30 extend from the side edges of section 24 in reversed positions to members 27 and 28.

The sections 23 and 24 are connected by a central section 31 approximately the same width as the end sections and formed by the angularly disposed sides of the pairs of protuberances 27, 30 and 28, 29 respectively. When the intermediate sections are folded together, the major protuberance 30 extends over and beyond 27.

In like manner the straight side of section 26 will overlie the notch 25.

The same offset arrangement occurs with the opposite side edges, notch 26 and protuberances 28 and 29. The slots are so shaped in the middle that the transverse bars 3 on both sides of the dotted middle line of the form strip are enlarged in longitudinal direction of the same. These enlargements 4 and 5 form, as described further below, the heads of the connecting links after folding the form strips, and are, for reasons also explained below, longitudinally slightly displaced towards each other.

Especially from FIG. 2 it can be seen, that the form strip 2 is provided along its middle line or its symmetric plane with two semi-circular grooves 16 and 18. Furthermore, the form strip is cut away or recessed on the upper side, at 14 and 15, whereas on its under side in the proximity of the edges are longitudinal grooves 19 and 20. The slanting external zones 15 and 14 overlap with the transverse slot 2; the longitudinal grooves 19 and 20 are within these overlapping zones.

The shaping of the form strip in the manner described above can be effected for example, by injection moulding of a profile according to FIG. 2 from a synthetic material with the help of an extrusion press. Afterwards the transverse slots 2 are cut into the cooled and hardened form strip by means of a punch. In order to connect the flat form strip obtained according to FIGS. 1 and 2 with a carrying strap, both of its halves are pressed together along the dotted middle line, as indicated by the two arrows in FIG. 2. The longitudinal grooves 16 and 18 facilitate the folding.

FIGS. 3 and 4 show the form strip in a folded position with the inserted carrying strap 9. The folding causes both halves of the transverse bars 3 to lie flatly on top of each other, thus forming the connecting links 8. The heads of these connecting links are formed by the enlargements 4 and 5 of the transverse bars in such a way, that they can receive and hold fast the corresponding bipartite heads of the opposed form strips. Through the displacement of the enlargements 4 and 5 in longitudinal direction of the form strip as described above, stops are formed on the heads of the connecting links 8 which protrude longitudinally, i.e. into the slots between the connecting links. When the fastener is closed, these stops press against the corresponding opposite stops of the heads of the opposite form strips and prevent a lateral displacing of the interlocking heads. The faces 17 of the heads of the connecting links 8, which have been formed by folding the flat form strip along the longitudinal groove 18, are substantially plane. FIG. 4 shows especially that after the folding of the flat form strip the slants 14 and 15 positioned opposite each other, form a continuous longitudinal groove between the equally longitudinally running connecting bars 7 of the individual connecting links 8. Into this longitudinal groove a carrying strap of textile synthetic material or any other suitable material is inserted. At the same time, on each side of the carrying strap—two cover strips 10 and 11 of the same or other material are inserted into the said longitudinal groove, whose edges 12 and 13 protruding from the groove, as shown in FIG. 3 lie at first on both sides of the carrying strap 9. Now, the folded form strip 1 is sewn with threads 20 on to the carrying strap 9 and to the cover strips 10 and 11. The threads are placed around the roots of the transverse bars 3, i.e. the connecting links 8 within the overlapping zone between the continuous longitudinal groove (14, 15) and the transverse slots 2 and are thus positioned in the longitudinal grooves 19 and 20 on the roots of the transverse bars 3. In this manner the threads are secured and cannot slide off into the reach of the heads of the connecting links 8.

In place of the above mentioned sewing or in addition to it the form strip 1 and the covering strips 10, 11 or the carrying strap 9 respectively can be glued.

Further, the overlapping edges 12 and 13 of the covering strips 10 and 11, are placed around the longitudinal edges, i.e. the connecting bars 7 of the form strip and placed both sides on the outer lateral surface of the folded form strip 1 (see FIG. 4).

The folded edges 12 and 13 are then also sewn to the form strip and/or rigidly glued to it.

The slide (not shown in the drawing) which opens and closes the finished slidable fastener grips the side surfaces of the opposite form strip, or the cover strip placed around those surfaces and sides with its holding claws on the carrying strap, or on the covering strip placed around the connecting bar 7.

FIG. 5 shows a modification of the invention which is advisable when the cover strips on both sides are not required. The form strip 1a is generally formed like the form strip 1 according to FIGS. 1 to 4. The difference from the former is, however, that the form strip 1a is holding two bars 30, which are pressed closely on to the connecting bar 7. Furthermore, the slanting parts are somewhat flat, as the longitudinal groove formed by them is supposed to take only the carrying strap 9. The bars 30 are placed flatly and jointly on to the carrying straps thus giving protection against the friction of the closing slide, which, in this arrangement, does not slide on the carrying strip, or the cover strips (FIG. 4) but on a longitudinal slide bar 31 at the bottom of bar 30.

FIGS. 6 and 7 show similar arrangements to FIG. 4. In the arrangement according to FIG. 6 the cover strips 12b and 13b on both sides of the form strip are formed by a one-piece band 10b, which is placed around a carrying strap into the longitudinal groove of the form strip. In the arrangement according to FIG. 7 instead, the covering strip 10c with its folded edge 12c is in one piece with the carrying strap 9c, whereas the other covering strip 11 with its folded edge 13 is separately inserted. FIG. 8 shows a finished slidable fastener, made of form strips according to FIG. 4. In order to simplify matters, the heads of the connecting links 8 and 8' are not shown as displaced double heads, but only singly. The form strips are each connected to carrying strips 9 and 9' by means of threads 21 and 21' and on both sides covered by covering strips 13 and 12', which—when the fastener is closed—meet flatly in the middle, thus completely covering the indented connecting links 8 and 8'. The wedge shown at 22 of the slide (not shown) for opening and closing the slidable fastener, grips in the known manner between the opposing connecting links 8 and 8' and bends the fastener halves apart.

In the arrangement as per FIG. 9 the overlapped interlocking of the connecting links 8 and 8' can be seen, as well as the closely meeting covering strips 12 and 13' or 13 and 12'.

As mentioned at the beginning, the form strips could also be set onto edges of two material or foil breadths which are to be joined, without providing a special carrying strap 9. If the breadths which are to be joined are of a thermoplastic material, they can be connected to the form strip by melting instead of sewing.

What is claimed is:
1. A multiple fastener member of molded elastic sheet material bent longitudinally in the center with contiguous overlying, transverse bars and having longitudinal side bars, the side bars and the adjacent portions of the transverse bars being recessed on their contiguous faces.

2. A multiple fastener member of molded elastic material bent longitudinally in the center with contiguous said transverse bars having their inner ends raised on one side to form abutting surfaces when the member is folded longitudinally, and overlying, transverse bars and longitudinal side bars, said transverse bars having their inner ends raised on one side to form abutting surfaces when the member is folded longitudinally, and the side bars and the adjacent portions of the transverse bars being recessed on their contiguous faces, said transverse bars being laterally grooved on the outer sides opposite the said recessed portions.

3. A multiple fastener member of molded elastic material bent longitudinally in the center with contiguous overlying, transverse bars and longitudinal side bars, said transverse bars having their inner ends raised on one side to form abutting surfaces when the member is folded longitudinally, and the side bars and the adjacent portions of the transverse bars being recessed on their contiguous faces, and a cover member folded permanently around the side bars and through the intermediate recess.

4. A multiple fastener strip of flexible molded material having longitudinal side bars and transverse connecting bars with a raised central portion, said transverse bars having grooves at their centers on opposite sides to provide an area of maximum flexibility, said transverse bars being bent into extended contact with the side bars in spaced parallelism.

References Cited in the file of this patent

UNITED STATES PATENTS

| 2,316,787 | Gould | Apr. 20, 1943 |
| 2,392,934 | Marinsky | Jan. 15, 1946 |
| 2,876,519 | Dittmayer | Mar. 10, 1959 |

FOREIGN PATENTS

| 542,962 | Belgium | Dec. 15, 1955 |
| 551,821 | Belgium | Nov. 14, 1956 |
| 408,797 | Italy | Jan. 10, 1945 |